W. N. VANCE.
METAL SHELVING.
APPLICATION FILED OCT. 10, 1912.
1,057,189. Patented Mar. 25, 1913.
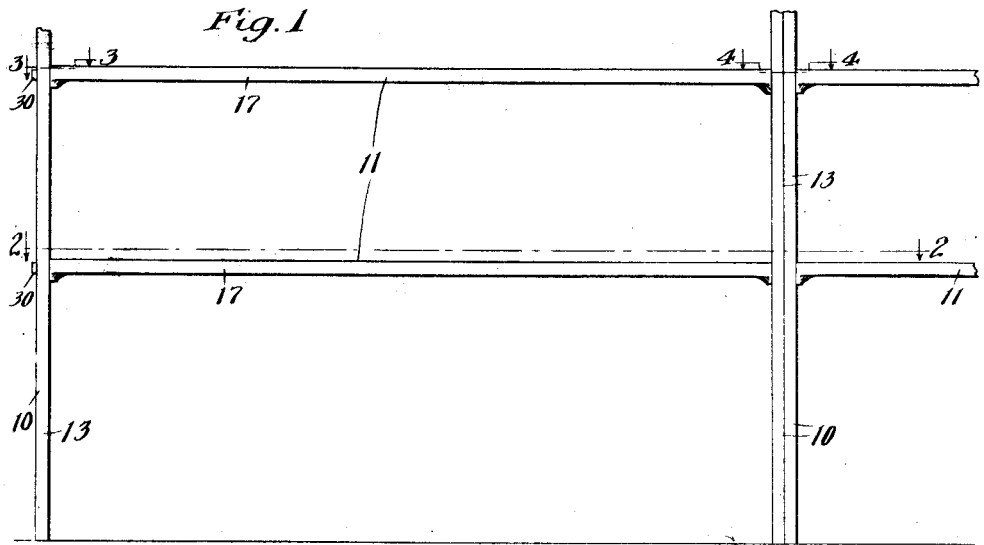
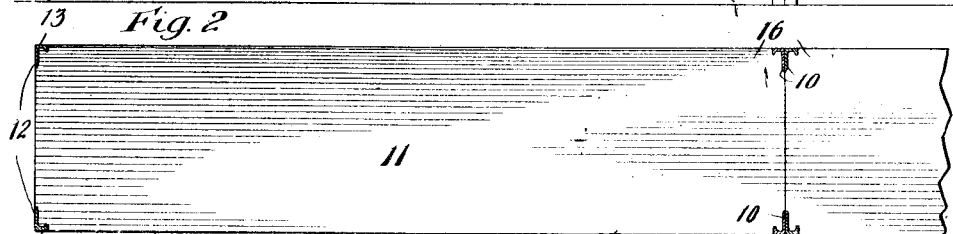
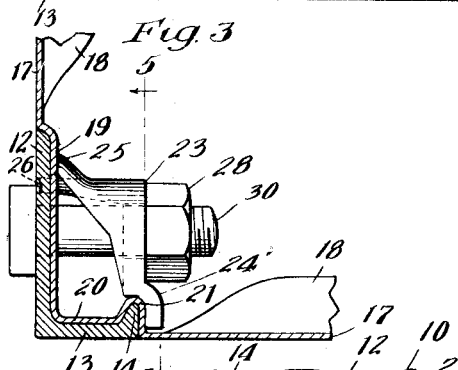
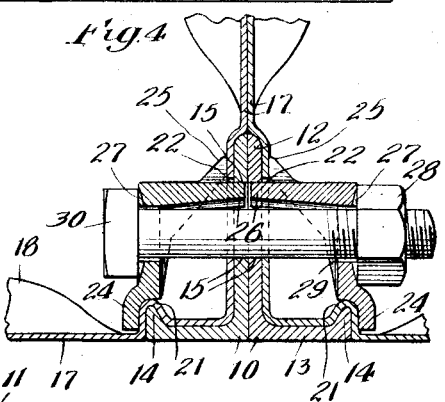
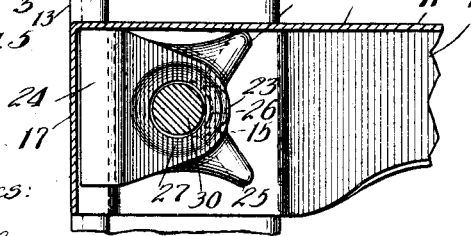
Inventor:
Walter N. Vance
By Munday, Evarts, Adcock & Clarke,
Attys
Witnesses:
Wm. Geiger
H. W. Munday

UNITED STATES PATENT OFFICE.

WALTER N. VANCE, OF CHICAGO, ILLINOIS.

METAL SHELVING.

1,057,189.  Specification of Letters Patent.  Patented Mar. 25, 1913.

Application filed October 10, 1912. Serial No. 724,948.

*To all whom it may concern:*

Be it known that I, WALTER N. VANCE, a citizen of the United States, residing in Chicago, in the county of Cook and State of Illinois, have invented a new and useful Improvement in Metal Shelving, of which the following is a specification.

This invention relates to improvements in metal shelving, such for instance as is used in factories to form portable racks for receiving or holding various articles being manufactured or used. My improvement may also be used in many other instances where adjustable or replaceable shelves are employed, such for example as are used in stores for supporting merchandise or where shelves are employed for supporting books.

The object of my invention is to provide a strong, durable, easily manufactured shelving that may be easily assembled and disassembled and which includes a bracing or locking member that positively prevents any loose play between the parts after the nut is screwed home on the bolt.

More specifically my invention embraces L-shaped uprights, made preferably of pressed or rolled steel, and provided with a plurality of spaced holes, shelves, also preferably made of pressed or rolled steel, said shelves having depending flanges provided with holes adapted to aline and coöperate with those in the uprights, interengaging wedge shaped ribs and grooves on the shelves and uprights, a substantially right-angled brace member which may be made either from a stamped piece of steel or in the form of a casting, and having a projection thereof adapted to enter the recesses or holes in the shelf flanges, and uprights, and bolts adapted to pass through recesses in the brace members and the recesses in the shelves and uprights, whereby the members when assembled may be easily tightened and locked in place by means of nuts threaded thereon.

My invention furthermore consists in the novel construction of parts and devices and in the novel combinations of parts and devices herein shown and described or claimed.

In the drawings forming a part of this specification, Figure 1 represents a front elevation of a structure embodying my improvements. Fig. 2 is a section of the structure shown in Fig. 1 taken on line 2—2 of Fig. 1. Fig. 3 is an enlarged sectional view taken on the line 3—3 of Fig. 1. Fig. 4 is an enlarged detail view taken on the line 4—4 of Fig. 1 and Fig. 5 is an enlarged detail sectional view taken on the line 5—5 of Fig. 3.

In the drawings 10 denotes the upright members to which are connected the shelves 11. The shelves may be of any desirable shape and the number of uprights used may be increased or diminished as desired. However, I have shown my improvements in connection with shelves of rectangular shape and supported by an upright at each corner. Each of the uprights 10 is L-shaped in cross-section and is composed of members 12 and 13, the member 13 having a wedge shaped rib 14 thereon at one end. The portion 12 of each of the uprights is provided with a plurality of spaced substantially elliptical recesses 15, each of these recesses being adapted to receive a bolt and a projection on the brace member. Each of the shelves 11 consists of a horizontal or supporting portion 16 provided with depending flange portions 17, each of said flange portions having an inturned portion 18, these inturned portions 18 being formed only intermediate the corners of the shelf. At each corner the shelf is provided with a portion adapted to fit the inner side of the L-shaped uprights and consists of offset portions 19 and 20 and a V or wedge shaped groove 21 adapted to coöperate with the rib 14 on the upright. The portions 19 and 20 are so offset as to leave the depending flanges 17 of the shelf flush with the exterior sides of the members 12 and 13 of the upright members. Each of the portions 19 is furthermore provided with a recess 22 corresponding in shape and size to the recesses 15 of the uprights 10.

Coöperating with the uprights 10 and the shelves 11 at each corner are brace members 23, each brace comprising a substantially right-angled member having a projection 24 adapted to fit over the portion 21. The brace member 23 is provided on its opposite edge with spaced projecting members or feet 25 adapted to rest on the offset portion 19 of the flange of the shelf. Intermediate the projections 25 on the brace member is a projection 26 which extends beyond the flat faces of the members 25 and is adapted to extend into the recesses 22 and 15 of the shelf and upright member respectively. This brace 23 may be made of sheet metal but is preferably formed by casting and is also preferably provided with a concave recess 27 on its outer face in which is adapted to seat the rounded face of the nut 28. The brace member 23 is also furthermore provided with a recess 29 alining with the recesses 22 and 15 all of said recesses being adapted to receive and retain a bolt 30 on which is threaded the nut 28.

It will be apparent that other forms of retaining members may be substituted for the nut and bolt 28 and 30, such for instance as a member having a head thereon and threaded into the brace member 23.

With the structure which I have shown it is apparent that the shelves may be adjusted vertically on the uprights 10 by means of the recesses 15 in the uprights and that upon screwing home the nut 28 on each of the bolts the members are rigidly and solidly connected together, and on account of the projection 26 fitting in the recesses 22 and 15, as perhaps more clearly shown in Fig. 5 in dotted lines, there is no chance of the shelf rotating or sliding on the upright. Furthermore by providing the offset portions 19 and 20 at each corner of the shelf and the coöperating wedge shaped ribs and grooves 14 and 21, I provide additional bracing means which prevent the shelf from oscillating on the uprights.

It is apparent that many changes in the details of my improvements may be made without departing from the spirit of the invention and all such changes are contemplated as fairly come within the scope of the appended claims.

I claim:—

1. In a device of the class described, the combination with an upright member, of a shelf, a brace member, a locking member, said upright member, shelf and brace member each being provided with a recess adapted to receive the locking member, substantially as specified.

2. In a device of the class described, the combination with an upright member, of a shelf, a brace member, a locking member, said upright member, shelf and brace member each being provided with a recess adapted to receive the locking member, and said brace member having a projection thereon adapted to enter the recesses in the shelf and upright, substantially as specified.

3. In a device of the class described, the combination with an L-shaped upright member, of a shelf having one corner thereof adapted to fit the L-shaped member, a brace, a locking member, said upright member, shelf and brace member each being provided with a hole adapted to receive the locking member, substantially as specified.

4. In a device of the class described, the combination with an L-shaped upright member, of a shelf having one corner thereof adapted to fit the L-shaped member, a brace, a locking member, said upright member, shelf and brace member each being provided with a hole adapted to receive the locking member, and said brace member having a projection thereon adapted to enter the recesses in the shelf and upright, substantially as specified.

5. In a device of the class described, the combination with an upright L-shaped member, of a shelf having a flange therearound, a right-angled brace member, a locking member, said upright member, shelf and brace each being provided with a recess adapted to receive the locking member, substantially as specified.

6. In a device of the class described, the combination with an upright L-shaped member, of a shelf having a flange therearound, a right-angled brace member, a locking member, said upright member, shelf and brace each being provided with a recess adapted to receive the locking member, and said brace member having a projection thereon adapted to enter the recesses in the shelf and upright, substantially as specified.

7. In a device of the class described, the combination with an L-shaped upright member having a wedge shaped rib thereon, of a shelf provided with a depending flange therearound, said flange being provided with a V or wedge shaped groove adapted to coöperate with the wedge shaped rib on the upright, a bolt and nut, and a brace member, said upright member, shelf and brace member being each provided with a recess adapted to receive the bolt, substantially as specified.

8. In a device of the class described, the combination with an L-shaped upright member having a wedge shaped rib thereon, of a shelf provided with a depending flange therearound, said flange being provided with a V or wedge shaped groove adapted to coöperate with the wedge shaped rib on the upright, a bolt and nut, and a brace member, said upright member, shelf and brace member being each provided with a recess adapted to receive the bolt, and said brace member having a projection thereon adapted to enter the recesses in the shelf and upright, substantially as specified.

9. In a device of the class described, the combination with an L-shaped upright member provided with a plurality of recesses, of a shelf having a flange around its edges and having one corner thereof adapted to fit the L-shaped member, said flange being provided with a recess, a brace member, said brace member being also provided with a recess, and a bolt and nut, said bolt being adapted to pass through the recesses in the brace member, flange and upright member, substantially as specified.

10. In a device of the class described, the combination with an L-shaped upright member having a wedge shaped rib thereon, of a shelf provided with a depending flange therearound, said flange being provided with a V or wedge shaped groove adapted to coöperate with the wedge shaped rib on the upright, a bolt and nut, and a brace member, said upright member, shelf and brace member being each provided with a recess adapted to receive the bolt, a brace member having a projection thereon adapted to enter the recesses in the shelf and upright, and another projection fitting over the grooved portion of the shelf flange, substantially as specified.

11. In a device of the class described, a right-angled brace member provided with a recess adapted to receive a bolt and having a projection at one edge thereof, and being provided with a plurality of projections at its opposite edge, one of said last named projections extending beyond the face of the other projections, substantially as specified.

12. In a device of the class described, a substantially right-angled brace member provided with a recess 29, a concave portion 27 and projection 24, projections 25, and 26, substantially as specified.

13. In a device of the class described, the combination with an L-shaped upright member provided with a wedge shaped rib, of a shelf provided with a depending flange on each edge, said flange being offset at the corner of said shelf and adapted to fit within the L-shaped upright whereby the remaining portions of the depending flange is flush with the exterior of the upright, and said offset flange portion being provided with a wedge shaped groove adapted to coöperate with the wedge shaped rib of the upright, a brace member provided with a projection adapted to fit over the groove of the flange, a bolt and nut, said brace, flange, and upright being each provided with a recess adapted to receive the bolt, the recesses in the flange and the upright being larger than the cross sectional area of the bolt and adapted to receive a projection on the brace member, substantially as specified.

14. In a device of the class described, the combination with a plurality of L-shaped upright members each provided with a plurality of spaced recesses, of a shelf supported by said upright members, said shelf being provided with corners adapted to fit the L-shaped members, each of said corners of the shelf being inwardly offset so as to leave the remaining portions of the edges of the shelf flush with the exterior surfaces of the uprights, a right-angled brace member, a bolt and nut at each corner of the shelf, each of said brace members and uprights and offset portions at the corners of the shelf being provided with a recess adapted to receive the bolts, substantially as specified.

15. In a device of the class described, the combination with a plurality of L-shaped upright supporting members, each upright member being provided with a wedge shaped rib, and a plurality of spaced recesses, of a plurality of rectangular shelves each provided with corners adapted to fit the L-shaped uprights, each of said shelves being provided with a depending flange, said flanges at each corner being provided with a recess adapted to register with one of the recesses in the uprights, a brace member at each corner of the shelf and coöperating therewith, bolts and nuts, each of said brace members being provided with a recess, all of said recesses being adapted to receive the bolt, substantially as specified.

WALTER N. VANCE.

Witnesses:
ESTHER ABRAMS,
H. M. MUNDAY.